W. E. RYAN.
FOOT ACCELERATOR FOR AUTOMOBILES.
APPLICATION FILED NOV. 16, 1916.

1,223,619. Patented Apr. 24, 1917.

WITNESSES:

INVENTOR
Wilbur E. Ryan
BY
ATTORNEY

UNITED STATES PATENT OFFICE.

WILBUR E. RYAN, OF MEMPHIS, TENNESSEE, ASSIGNOR OF ONE-HALF TO CHARLES H. ROBERTSON, OF MEMPHIS, TENNESSEE.

FOOT-ACCELERATOR FOR AUTOMOBILES.

1,223,619.  Specification of Letters Patent.  Patented Apr. 24, 1917.

Application filed November 16, 1916. Serial No. 131,612.

*To all whom it may concern:*

Be it known that I, WILBUR E. RYAN, of Memphis, in the county of Shelby and State of Tennessee, have invented certain new and useful Improvements in Foot-Accelerators for Automobiles, of which the following is a specification, such as will enable any one skilled in the art to make and use same.

My invention relates to new and useful improvements in foot accelerators for automobiles and has especial reference to accelerators for cars in which the steering wheel and control levers are situated on the left hand side of the car and the carbureter on the right hand side. It has been specially designed as an adjunct to Ford automobiles and is hereinafter described with reference to that car. It is, of course, evident, however, that it may be adapted to other cars of the same type.

The objects of my invention are to make an accelerator which is simple and positive in action and which without a multiplicity of parts will provide operation of the carbureter on the right hand side by an operator on the left hand side of the car.

I accomplish these objects as will be more fully hereinafter set out in the drawings, specification and claims.

In the drawings, which are made, as before stated, to represent the accelerator as applied to a Ford car:

Figure 1:
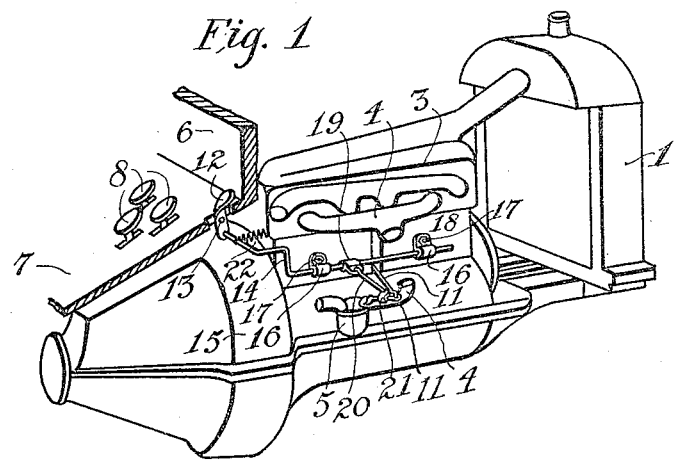
Figure 1 is a perspective view of the right hand side of an automobile engine assembly from the rear, showing the dash and foot board in section.
Figure 2:
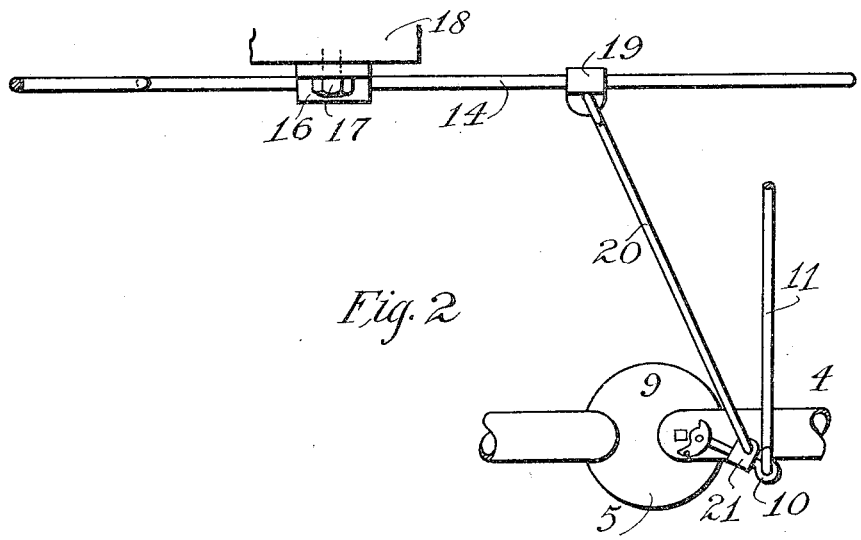
Fig. 2 is a plan view on an enlarged scale showing the detail of the operating mechanism at the carbureter.

Referring now to the drawings in which the various parts are indicated by numerals, 1 is a radiator, 2 the engine base, 3 the cylinders, which are here shown as cast *en bloc*, the whole being hereinafter called the engine assembly, and 4 the intake manifold supporting the carbureter 5, a portion of the manifold being cut away to more clearly show the detail of the accelerator. 6 is the dash board, 7 the foot board and 8 the various foot pedals of a Ford automobile. 9 is the stem of the carbureter valve, 10 the valve arm, and 11 a rod leading across between two of the cylinders to the hand control on the steering post, which latter parts are not shown.

My foot accelerator consists of a pedal 12, which extends beneath the floor board 7 through an opening in same and is pivoted at 13 to the said floor board. 14 is the accelerator rod which passes through a hole in the lower end of the pedal 12 and which extends horizontally therefrom to the right (looking toward the front of the car) and away from the center of the engine assembly then bends forward in the same plane and substantially parallel to the axis of the engine assembly until it clears the flywheel casing 15 and is then bent downward and again bent forward parallel to the axis of the said engine assembly. This last section of the rod is carried by two guides 16, 16 in which it slides freely in a direction parallel to the axis of the engine assembly. These two guides in the case of a Ford automobile are held by the bolts and nuts 17 which ordinarily hold on the cover plates 18. 19 is a bracket securely fastened to the rod 14 and in which is pivoted a connecting arm 20 which extends over to and is pivoted in a similar bracket 21 on the valve arm 10 of the carbureter 5, thus giving a pivoted arm connecting said accelerator rod and the carbureter valve arm. 22 is a spring normally holding the accelerator rod 14 forward and the pedal 12 up.

The action of the device is as follows:—

The pedal 12 being depressed pulls the rod 14 backward, extending the spring 22, and, as the rod slides in the guides 16, pulling the rod 20 and shifting the valve arm 10 to the left to open the carbureter valve. Release of the foot pedal permits the spring 22 to pull the rod 14 forward closing carbureter valve.

If desired a flexible link may be substituted for the rod 11 so that the operation of the foot pedal will not disturb the setting of the hand throttle on the steering post.

It will be especially noted that in the special construction shown I have invented an extremely simple device, free from a multiplicity of parts and one in which there is a minimum tendency toward rattling and noise.

Having fully described my invention, what I claim and desire to secure by Letters Patent in the United States is:—

In an accelerating mechanism for automobiles, the combination with a carbureter and its operating arm, of a bracket on the said operating arm, guides in longitudinal alinement with the axis of the automobile, a rod slidably mounted in said guides to permit motion parallel to the axis of the automobile, said rod being bent upward near its rear end to clear the flywheel case of the engine, thence extended backward in a horizontal plane over said case, thence bent at right angles in a horizontal plane toward the center line of the automobile, an arm pivoted to said rod and to the bracket on the carbureter operating arm, a spring normally holding said rod retracted and a foot pedal near the axial center of the automobile, extending downward through the foot board, pivoted thereto, and engaging said rod so that said rod will be moved forward when said pedal is depressed, substantially as and for the purposes set forth.

In testimony whereof I have hereunto set my name.

WILBUR E. RYAN.

Witnesses:
A. H. PAYNE,
D. C. MILLER.

Copies of this patent may be obtained for five cents each, by addressing the "Commissioner of Patents, Washington, D. C."